United States Patent
Dunne et al.

(10) Patent No.: US 9,917,946 B2
(45) Date of Patent: Mar. 13, 2018

(54) DETERMINING THE AVAILABILITY OF PARTICIPANTS ON AN ELECTRONIC CALL

(71) Applicant: International Business Machines Corporation, Armonk, NY (US)

(72) Inventors: Jonathan Dunne, Dungarvan (IE); James Patrick Galvin, Jr., Georgetown, KY (US); David Malone, Maynooth (IE); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/724,408

(22) Filed: Dec. 21, 2012

(65) Prior Publication Data

US 2014/0177480 A1 Jun. 26, 2014

(51) Int. Cl.
*H04M 3/42* (2006.01)
*H04M 3/56* (2006.01)

(52) U.S. Cl.
CPC ....... *H04M 3/42365* (2013.01); *H04M 3/563* (2013.01)

(58) Field of Classification Search
CPC .......... H04M 2203/00–2203/658; H04M 3/42–3/42365; H04L 12/18–12/1863; H04L 67/00–67/42
USPC ................. 370/259, 260, 352, 522
See application file for complete search history.

(56) References Cited

U.S. PATENT DOCUMENTS

| | | | |
|---|---|---|---|
| 7,555,108 B2 | 6/2009 | Sylvain | |
| 8,743,743 B1* | 6/2014 | Mai | H04M 3/566 370/260 |
| 2002/0024947 A1* | 2/2002 | Luzzatti et al. | 370/352 |
| 2005/0153724 A1* | 7/2005 | Vij | H04W 4/06 455/518 |
| 2006/0023061 A1* | 2/2006 | Vaszary | H04M 3/56 348/14.08 |
| 2006/0023915 A1* | 2/2006 | Aalbu et al. | 382/103 |
| 2006/0146798 A1 | 7/2006 | Harton et al. | |
| 2006/0245558 A1* | 11/2006 | Gatzke et al. | 379/88.16 |
| 2007/0081644 A1* | 4/2007 | Jachner | 379/106.01 |
| 2008/0240384 A1* | 10/2008 | Suryanarayana et al. | 379/88.21 |
| 2010/0177879 A1 | 7/2010 | Liljestrand et al. | |
| 2011/0055369 A1* | 3/2011 | Oh | H04L 67/24 709/224 |

(Continued)

*Primary Examiner* — Benjamin H Elliot, IV
*Assistant Examiner* — Prince A Mensah
(74) *Attorney, Agent, or Firm* — Brian J. Colandreo, Esq.; Jeffrey T. Placker, Esq.; Holland & Knight LLP (57) ABSTRACT

A method, computer program product, and system for determining the availability of participants on a communication session is described. According to an embodiment, a method for determining a participant's availability may include receiving status information associated with a first user participating in a unified telephony call, the status information indicative of an availability of the first user. The method may also include determining an availability status for the first user based on, at least in part, the status information. The method may further include providing, by the one or more computing devices, a status indicator associated with the first user to at least a second user participating in the unified telephony call based on the availability status for the first user.

24 Claims, 5 Drawing Sheets

(56) References Cited

U.S. PATENT DOCUMENTS

| | | | |
|---|---|---|---|
| 2011/0066688 A1* | 3/2011 | Pinding | H04L 67/24 709/206 |
| 2011/0074579 A1* | 3/2011 | Agulnik et al. | 340/541 |
| 2012/0226806 A1* | 9/2012 | Knight | G06F 9/4843 709/224 |
| 2012/0308044 A1* | 12/2012 | Vander Mey | H04L 12/1822 381/104 |

* cited by examiner

DETERMINING THE AVAILABILITY OF PARTICIPANTS ON AN ELECTRONIC CALL

TECHNICAL FIELD

This disclosure relates to electronic communication.

BACKGROUND

Various collaborative communications platforms exist, such as unified telephony systems, that may allow users of the system to communicate with one another for various purposes. For example, such systems may support multi-party communications, such as conference calls, web-conferences, virtual meetings, and the like. As is sometimes the case, one or more parties on a call may do most of the talking, with other parties participating in a more passive or listening role. In some such circumstances, the speaking parties may not be aware of changes in circumstances of other participants on a call, which can lead to confusion, for example, if a response, or other input is solicited from generally passive or listening party on the call. For example, such a passive or listening party may have become distracted from participation in the call, but due to their passive role on the call, the other participants may not be aware of the change in circumstance.

BRIEF SUMMARY OF THE DISCLOSURE

According to a first aspect of the disclosure, a computer-implemented method includes receiving, on one or more computing devices, status information associated with a first user participating in a unified telephony call. The status information may be indicative of the availability of the first user. The method also includes determining an availability status for the first user based on, at least in part, the status information. The method further includes providing, by the one or more computing devices, a status indicator associated with the first user to at least a second user participating in the unified telephony call based on the availability status for the first user.

One or more of the following features may be included. The status indicator may be representative of the availability of the first user during the unified telephony call. Receiving status information associated with the first user may include continuously receiving status information during the unified telephony call. Receiving status information associated with the first user may include periodically sampling status information during the unified telephony call. Periodically sampling status information may include receiving a pulse signal transmitted at a predetermined time interval during the unified telephony call. The method may include associating one or more visual indicators with the one or more status indicators associated with the first user. The method may also include receiving a request for the status information associated with the first user from at least one participant device associated with the unified telephony call. The status indicator may include one or more of alphanumeric sequences, numerical codes, and icons, signifying a status indicator from a predetermined list of status indicators.

According to another aspect of the disclosure, a computer program product resides on a computer readable storage medium and has a plurality of instructions stored on it. When executed by a processor, the instructions cause the processor to perform operations including monitoring one or more characteristics of an electronic call. Instructions may be included for receiving status information associated with a first user participating in a unified telephony call. The status information may be indicative of an availability of the first user. Instructions are included for determining an availability status for the first user based on, at least in part, the status information. Instructions are included for providing a status indicator associated with the first user to at least a second user participating in the unified telephony call based on the availability status for the first user.

One or more of the following features may be included. The status indicator may be representative of the availability of the first user during the unified telephony call. Receiving status information associated with the first user may include continuously receiving status information during the unified telephony call. Receiving status information associated with the first user may include periodically sampling status information during the unified telephony call. Periodically sampling status information may include receiving a pulse signal transmitted at a predetermined time interval during the unified telephony call. Instructions may further included for associating one or more visual indicators with the one or more status indicators associated with the first user. Instructions may further be included for receiving a request for the status information associated with the first user from at least one participant device associated with the unified telephony call. The status indicator may include one or more of alphanumeric sequences, numerical codes, and icons, signifying a status indicator from a predetermined list of status indicators.

According to another aspect of the disclosure, a computing system includes at least one processor and at least one memory architecture coupled with the at least one processor. The computing system also includes a first software module executable by the at least one processor and the at least one memory architecture. The first software module is configured to receive status information associated with a first user participating in a unified telephony call. The status information may be indicative of an availability of the first user. The computing system also includes a second software module executable by the at least one processor and the at least one memory architecture. The second software module is configured to determine an availability status for the first user based on, at least in part, the status information. The computing system further includes a third software module executable by the at least one processor and the at least one memory architecture. The third software module is configured to provide a status indicator associated with the first user to at least a second user participating in the unified telephony call based on the availability status for the first user.

One or more of the following features may be included. The status indicator may be representative of the availability of the first user during the unified telephony call. Receiving status information associated with the first user may include continuously receiving status information during the unified telephony call. Receiving status information associated with the first user may include periodically sampling status information during the unified telephony call. Periodically sampling status information may include receiving a pulse signal transmitted at a predetermined time interval during the unified telephony call. The computing system may include a fourth software module executable by the at least one processor and the at least one memory architecture. The fourth software module may be configured to associate one or more visual indicators with the one or more status indicators associated with the first user. The computing system may include a fifth software module executable by the at least one processor and the at least one memory architecture. The fifth software module may be configured to receive a request for the status information associated with the first user from at least one participant device associated with the unified telephony call. The status indicator may include one or more of alphanumeric sequences, numerical codes, and icons, signifying a status indicator from a predetermined list of status indicators.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

According to some example implementations consistent with the present disclosure, users may participate in a real-time call, such as a unified telephony (UT) call or session, using computing devices. For example, a group of participants may participate in a conference call to discuss the status of a project. During the call, one or more participants may engage in conversations. In some instances there may be a need for one or more participants on the call to determine the availability status of another participant on the same call. This can often occur when, for example, although a participant may be connected to the call, other participants may not know whether this participant is available, on mute, has become distracted from the call, or whether there are any difficulties in the connection. The participant may determine through a status indicator on his or her computing device the availability status of the other participants on the same call.

Figure 1:
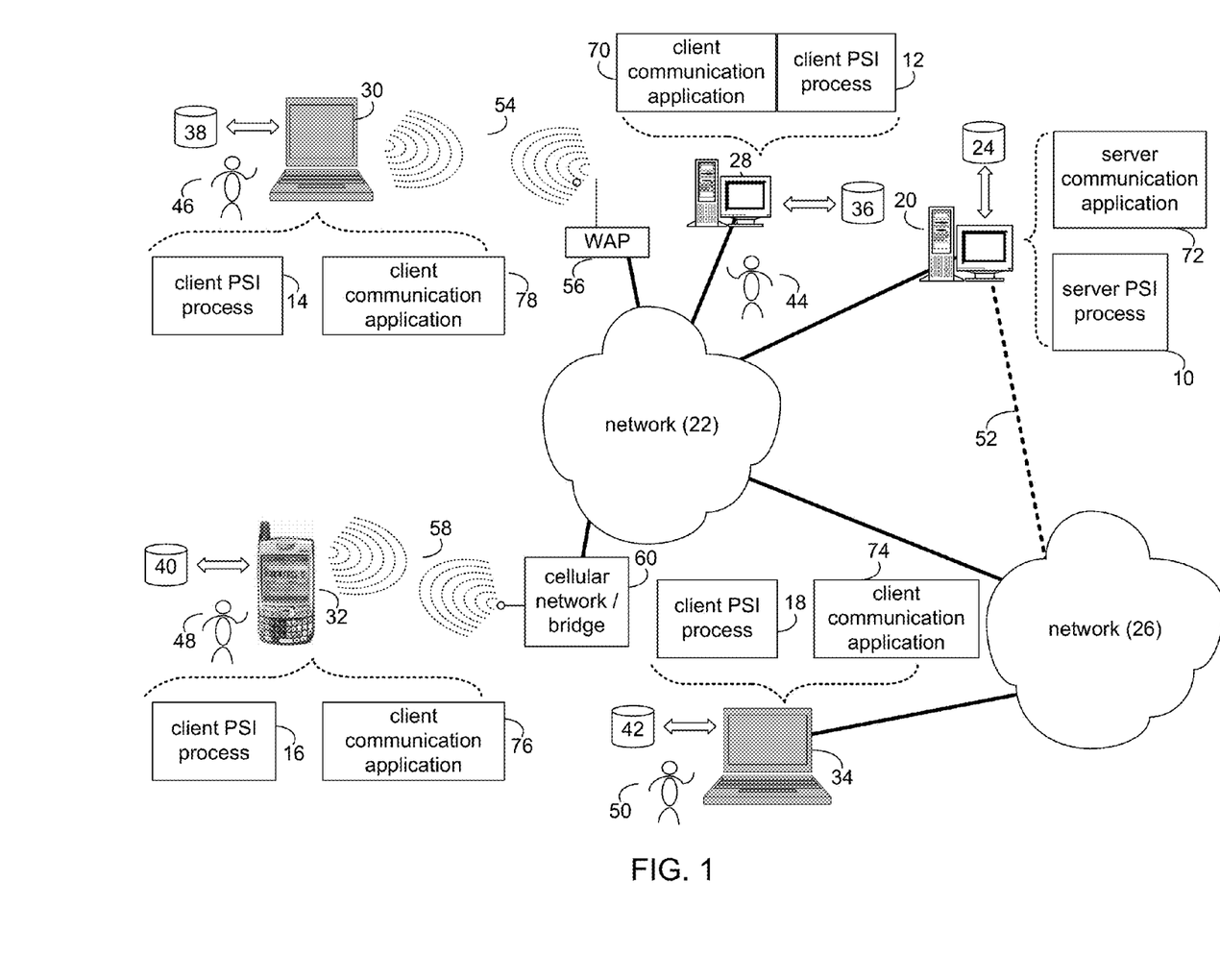
FIG. 1 is a diagrammatic view of a participant status indication process coupled to a distributed computing network.

Referring now to FIG. 1, there is shown a participant status indication (PSI) process coupled to a distributed computing network. A PSI process may be a server-side process, for example, server PSI process 10. A PSI process may also be a client-side process, for example, client PSI process 12, client PSI process 14, client PSI process 16, or client PSI process 18. A PSI process may also be a hybrid server/client process, in which some or all of the functionality of the PSI process is performed by the server and some or all of the functionality of the PSI is performed by one or more clients. As an example, a hybrid server/client process may include the combination of server PSI process 10 and one or more of client PSI processes 12, 14, 16, and 18. Further, one or more of client PSI processes 12, 14, 16, 18 and server PSI process 10 may interface with each other (e.g., via network 22 and/or network 26).

Figure 2:
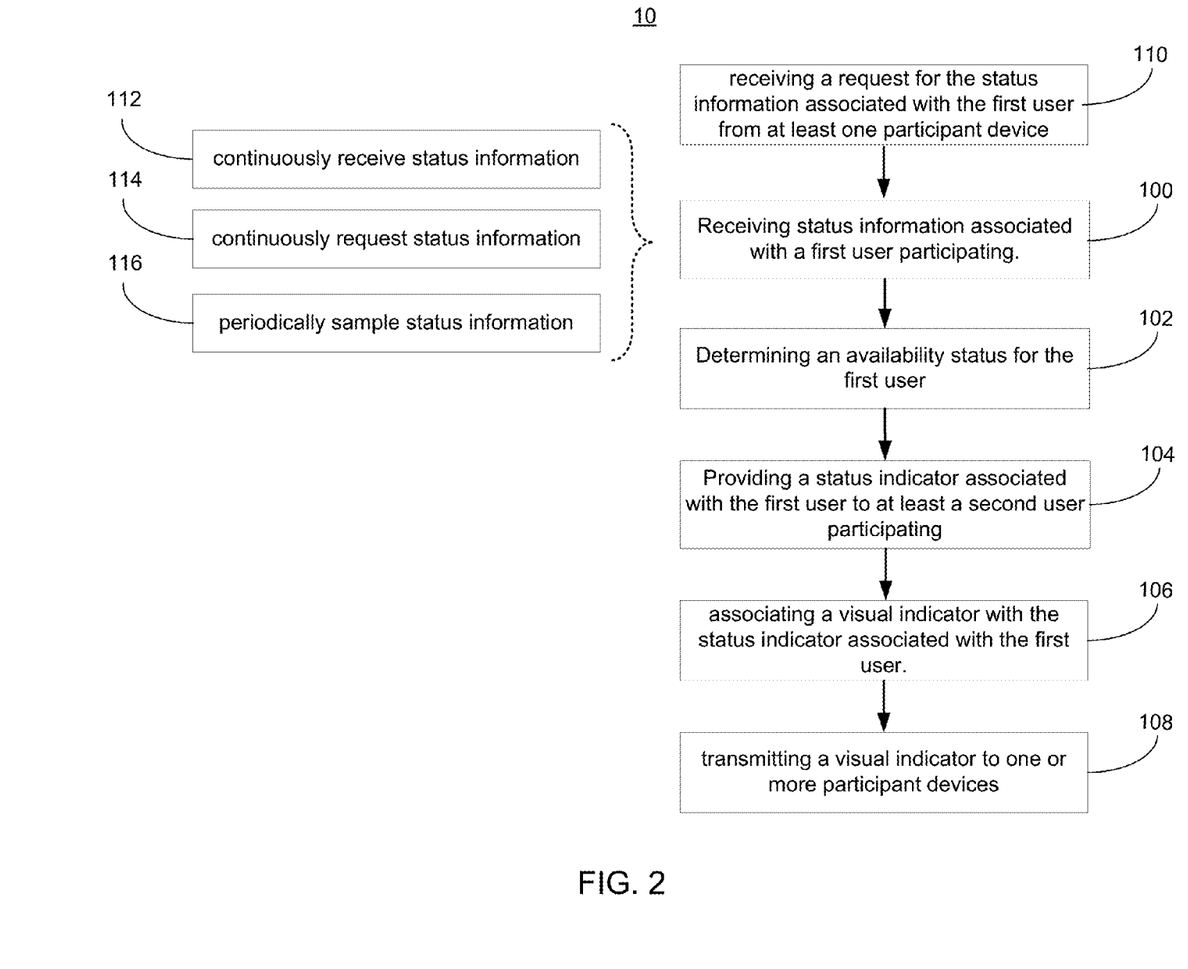
FIG. 2 is a flowchart of a process executed by the participant status indication process of FIG. 1.

Referring also to FIG. 2, and as will be discussed in greater detail below, PSI process 10 may receive 100 status information associated with a first user participating in a unified telephony call. The status information may be indicative of an availability of the first user. PSI process 10 may also determine 102 an availability status for the first user based on, at least in part, the status information. PSI process 10 may further provide 104 a status indicator associated with the first user to at least a second user participating in the unified telephony call based on the availability status for the first user.

Server PSI process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell®; Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server PSI process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server™, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; and Apache is a registered trademark of Apache Software Foundation in the United States, other countries, or both.) Network 22 may be connected to one or more secondary networks (e.g., network 26), examples of which may include but are not limited to: a local area network; a wide area network; or an intranet, for example.

Client PSI processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client PSI processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In order to facilitate electronic calls, a communication application may operate on a client device (e.g., client communication application 78, operating on client electronic device 30; client communication application 70, operating on client electronic device 28; client communication application 74, operating on client electronic device 34; or client communication application 76, operating on client electronic device 32). A client PSI process (e.g., client PSI process 14) or a server PSI process (e.g., server PSI process 10) may be in communication with a client communication application (e.g., client communication application 78) or may be part of the client communication application (e.g., as by being a module thereof), and/or may otherwise interact with one or more of a client communication application.

A communication application may additionally or alternatively operate on a server device (e.g., server communication application 72, operating on server computer 20). A server PSI process (e.g., server PSI process 10) or a client PSI process (e.g., client PSI process 14) may be in communication with a server communication application (e.g., server communication application 72) or may be a part of the server communication application (e.g., as by being a module thereof), and/or may otherwise interact with the server communication application.

Electronic calls may be implemented via communication applications, for example, client communication application 70 and/or server communication application 72. Electronic calls may be implemented using traditional telephony principles or through the use of cellular towers or may be implemented using Internet Protocol (IP) methods, as in, for example, Voice over IP (VoIP) calls. VoIP refers to the general method of facilitating audio communication through the delivery of audio and audio-visual information over IP networks. VoIP may also be referred to as IP telephony, Internet telephony, Voice over Broadband (VoBB), broadband telephony, and broadband phone. VoIP may be implemented using a variety of communication and computing devices, including cellular phones and fixed-line telephones.

In one implementation of an electronic call, audio and video communication between groups and individuals may be facilitated by unified telephony (UT) systems. UT sessions may allow two or more participants to communicate using a variety of devices, for example cellular phones, fixed line phones and computers or computing devices. Conventional UT servers may typically be deployed as part of a UT system and multiple servers may be implemented using both vertical and horizontal scaling. A UT server typically may provide audio and video capabilities to users that are configured on the server, permitting voice and video conferences across a plurality of users.

As an example of a UT system, a communication application such as Lotus Sametime® Unified Telephony may execute on server computer 20 as server communication application 72 (or on client electronic device 30 as client communication application 78). (Lotus and Sametime are trademarks of International Business Machines Corporation in the United States, other countries or both.) Lotus Sametime® Unified Telephony provides unified communications middleware which integrates telephony across multivendor Public Branch Exchange (PBS) systems and provides a unified end user experience, including integrated softphones, phone and IM presence awareness, and call management and control across multiple communications systems. UT technology may employ industry standard protocols such as Session Initiation Protocol (SIP) and other protocols defined by the Internet Engineering Task Force (IETF). (It will be understood that Lotus Sametime® Unified Telephony and other communication applications may operate additionally or alternatively as client communication applications, e.g., client communication application 70.)

UT sessions may be particularly suited for assignment of various channels associated with the sessions to proxy connections. This is due to the nature of UT communication, in which it may be expected that typically only one or two users may be actively participating in a UT session (e.g., speaking or texting) at any given time. As such, in response to (or anticipation of) a server saturation condition, a potentially large number of channels associated with a UT session may be assigned to one or more proxy connections in order to mitigate (or avoid) the server saturation condition. In other words, the nature of UT communication may allow for particularly aggressive use of the disclosed process. Specific examples in the discussion contained herein may refer exclusively to UT sessions, however, it will be understood that such discussion may be applicable to a variety of electronic communication session types.

Users 44, 46, 48, 50 (also variously referred to as "participants" or "moderators") may, for example, access server PSI process 10 directly through the device on which the client process (e.g., client PSI processes 12, 14, 16, 18) is executed, namely client electronic devices 28, 30, 32, 34. Users 44, 46, 48, 50 may access server PSI process 10 directly through network 22 and/or through secondary network 26. Further, server computer 20 (i.e., the computer that executes server PSI process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, server PSI process 10 will be described for illustrative purposes. It will be understood that server PSI process 10 may, for example, interact and/or communicate with one or more client PSI processes (e.g., client PSI processes 12, 14, 16, 18), and/or may be executed within one or more applications that allow for communication with other server and/or client PSI processes. This is not intended to be a limitation of this disclosure, as other configurations are possible (e.g., PSI process 10 may include stand-alone server processes and/or stand-alone client processes.) For example, some implementations may include one or more of client PSI processes 12, 14, 16, 18 in place of or in addition to server PSI process 10.

As generally discussed above, PSI process 10 may generally provide a status indicator to participants on a call, such as a UT session, to determine the availability status of one or more these participants. For example, a participant may be available on the call; however, his or her device may be muted. Accordingly, the status indicator may provide participants with up to date availability status of that participant and other participants on the call. In some implementations, the availability status information may allow participants to act according to the status indicator being provided by PSI process 10. For example, a participant may signal the muted participant that his or her device is muted.

The status indicator provided by the PSI process 10 may be based on status information that PSI process 10 may use, for example, to determine the availability of participants on the UT session. In some implementations, PSI process 10 may receive status information based on one participant requesting the availability status of another participant. In other implementations, status information may be provided to PSI process 10 at various time intervals.

As discussed above, PSI process 10 may generally receive 100 status information associated with a first user participating in a unified telephony call. The status information may be indicative of an availability of the first user. PSI process 10 may also determine 102 an availability status for the first user based on, at least in part, the status information. PSI process 10 may further provide 104 a status indicator associated with the first user to at least a second user participating in the unified telephony call based on the availability status for the first user.

PSI process 10 may receive 100 status information associated with a first user participating in a unified telephony call, where the status information may be indicative of the first user's availability. For example, and referring also to FIG. 3, a number of participants (e.g., participants 302, 304 and 306) may be involved in a call (e.g., UT session 300) using computing devices (e.g., computing devices 308, 310 and 312). Each of These computing devices may include display units (e.g., display screens 314, 316, 318). As explained above, UT sessions may allow two or more participants to communicate using a variety of devices, for example cellular phones, fixed line phones and computers or computing devices. While example UT session 300 includes three participants (i.e. 302, 304 and 306) and three computing devices (i.e. 308, 310 and 312), it will be appreciated that this is not a limitation but only for illustrative purposes, other UT sessions may include two or more participants using suitable computing devices when participating in a UT session.

Figure 3:
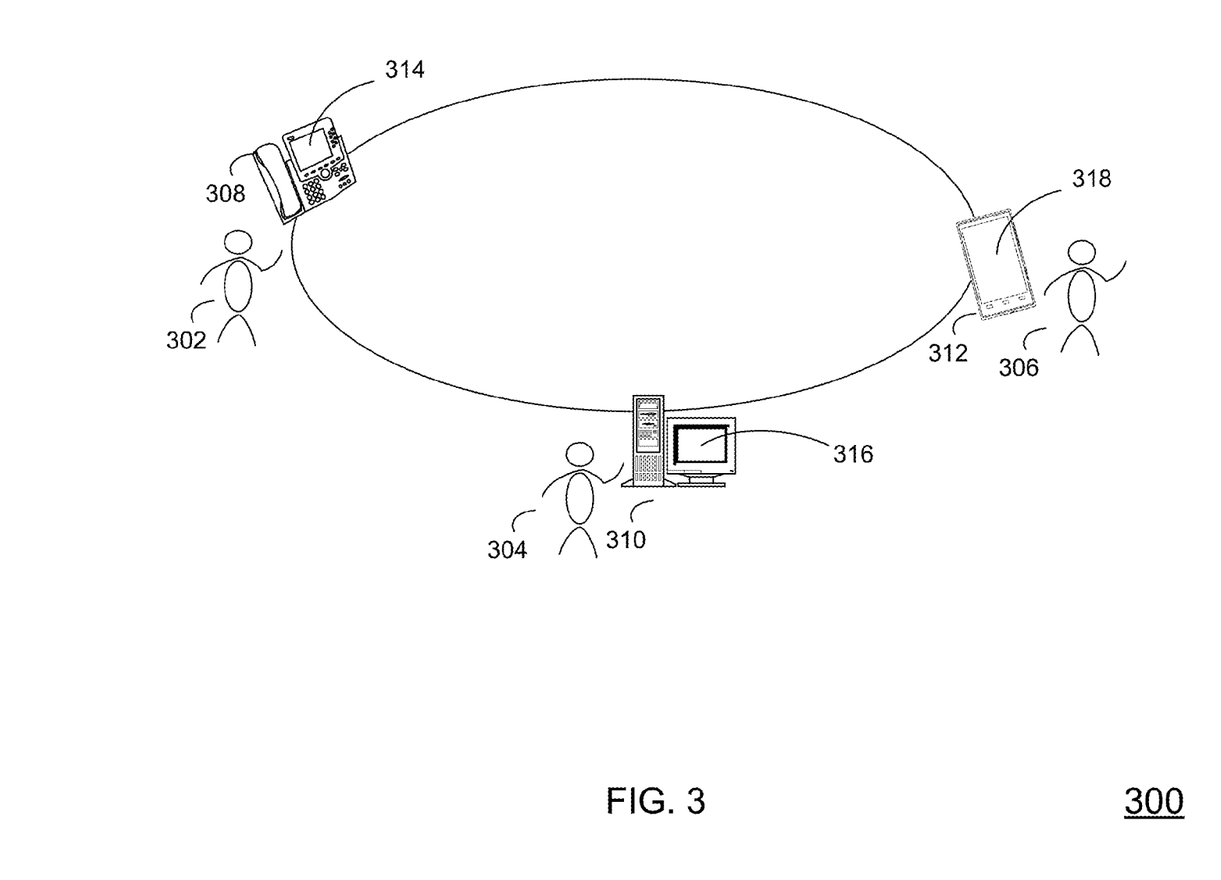
FIG. 3 is a diagrammatic view of an aspect of an implementation of the participant status indication process.

Consistent with the illustrated example of FIG. 3, a participant may have various different availability statuses in the UT session even though the participant may still be involved in the UT session. For example, during UT session 300 and while participants 302 and 306 may be in discussion with each, participant 306 may ask participant 304 a question, however, participant 304 may not respond. Participants in UT session 300 may be interested in determining the availability of participant 304, e.g., which may explain participant 304's lack of response, and/or participant 304's ability to answer future questions and/or be involved in the communication. As mentioned above and in this example, PSI process 10 may receive 100 the status information of participants on the UT session 300. For example, the status information of participant 304 may be transmitted by computing device 310 and may be received 100 by PSI process 10. It is understood that although the status information of participant 304 may be transmitted by computing device 310 and may be received 100 by PSI process 10, this is only for illustrative purposes and PSI process 10 may receive 100 the status information through other means (e.g., may PSI process 10 may receive 100 the status information from device or source other than computing device 310).

The status information may indicate the availability of one or more participants on a real-time call (e.g., UT session 300). The availability of participants may be based on any predetermined availability conditions that may be set by participants on the call (e.g., UT session 300), PSI process 10 or an administrator. The availability may be based, for example, on whether a participant is available, available but muted, available but indisposed, having audio or reception issues, dropped from the call but still active. For example, when participant 306 asked participant 304 a question, participant 304 may have been muted. In such a situation, the lack of a response received from participant 304 may arise from the fact that, even though participant 304 delivered a spoken response, because computing device 310 associated with participant 304 was muted, the response may not have been delivered to the other participants of UT session 300. The status information of participant 304 (e.g., being muted) may be transmitted by computing device 310 (e.g., in response to participant 304 pressing a mute button on computing device 310, or otherwise entering a muted status) and may be received 100 by PSI process 10. It is understood that participant 304 being muted is an example and other availability conditions may be possible. It is also understood that the above are only examples and that status information may be based on other availability conditions. Further, and as will be described below in further detail, if a participant's availability status changes due to at least the above availability conditions, the participant computing device, used to participate in the UT session, may send status information based on the availability condition. As will be explained below in more detail, PSI process 10 may provide one or more participants on UT session 300 with indication of participants' availability status.

In another embodiment, PSI process 10 may receive status information based on, for example, an elapsed time interval (e.g., of inactivity by a participant with respect to a UT session). For example, in UT session 300, if participant 308 has not contributed on the call, after an elapsed time interval his or her availability status may be changed to reflect that participant 308 is "available but indisposed/inactive." As a result, PSI process 10 may receive 100 the updated status information of participant 308 (e.g., based on the elapsed period of inactivity). Although, the availability status may set to "available but indisposed," this is intended as an example and other possible availability status may be chosen to depict participants' status.

PSI process 10 may receive 100 the status information or receive 110 a request for the status information, through various communication mediums. For example, PSI process 10 may receive 100 the status information or the request for status information associated with one or more participants on the call through communication channels (e.g. wireless communication channels 54 and 58) or through communication networks (e.g. network 22 and 26).

In one implementation, PSI process 10 may receive 100 status information associated with the first user participating in the unified telephony call including continuously receiving 112 status information associated with participants on a unified telephony call. PSI process 10 may continuously receive 112 the status information from participants' computing devices. For example, and referring also to FIG. 3, the status information may be continuously transmitted by the computing devices (e.g., computing devices 308, 310 and 312) of participants involved in UT session 300 (e.g., participants 302, 304 and 306). The status information may be continuously transmitted at various time intervals. Time intervals may be based on an elapsed time. For example, after certain time interval elapses, the status information of participants on a UT session may be transmitted. Time intervals may also be based on a predetermined time interval set by PSI process 10, by an administrator or one or more participants of the UT session.

In another implementation, PSI process 10 may continuously request 114 status information from one or more participants in UT session (e.g., participants 302, 304 and 306). In such an implementation, PSI process 10 may receive 100 the status information associated with the first user based on, at least in part, the continuous request 114. For example, in response to the request 114 from PSI process 10, one or more computing devices associated with PSI process 10 may transmit a response, which may include status information associated with the participant using the computing device. PSI process 10 may receive 100 the status information transmitted by the computing devices in response to the request 114 from PSI process 10. PSI process 10 may update one or more participants on the UT session 300 with the status information result of the continuously requested status information. For example, PSI process 10 may continuously request the status information of one or more participants in UT session 300 and PSI process 10 may update one or more computing devices (e.g., computing device 312) with the status information result. As a consequence, PSI process 10 may notify one or more participants (e.g., participants 302, 304 and 306) in UT session 300 of the status information of participants on UT session 300. As will be explained below in more detail, PSI process 10 may provide one or more participants on UT session 300 with a status indicator of the availability status of other participants on the call.

In one embodiment, one or more participants may set their availability status using their computing devices. For example, participant 304 on UT session 300 may set his or her status as muted on his or her computing device 310. In this case, the status information of participant 304 may be set accordingly to reflect that participant 304 may be muted. It is understood that the above is only an example and other status information may be set. For example, the status information may be based, for example, on whether a participant is available, available but muted, available but indisposed, having audio or reception issues, dropped from the call but still active. PSI process 10 may receive 100 the status information of participant 304 on UT session 300.

In another implementation, PSI process 10 may receive 100 status information associated with the first user may include periodically sampling 116 status information during the unified telephony call. For example, PSI process 10 may periodically inquire (e.g., transmit a status information request) about the availability status of one ore more participants in a person to person or multi-party call (e.g., UT session 300). Periodically sampling 116 status information may include periodically transmitting the request for status information and/or may include receiving the response to the periodically transmitted request. The periodic sampling 116 of status information may use a pulse signal transmitted by PSI process 10, where the result of the pulse signal may be the status information of one or more participants on a call (e.g., UT session 300), which may be transmitted to PSI process 10 by one or more computing devices associated with participants of UT session 300 (e.g., which may have received the pulse signal transmitted by PSI process 10). The pulse signal may be transmitted between one more participants on the call or may be transmitted between one or more participant and PSI process 10. For example and still referring to FIG. 3, PSI process 10 may transmit a pulse signal that contains information of all participants on the call (e.g., participants 302, 304 and 306). The pulse signal may return status information associated with participants (e.g., participants 302, 304 and 306) on the call (e.g., UT session 300). As explained above the status information may be based, for example, on whether a participant is available, available but muted, available but indisposed, having audio or reception issues, dropped from the call but still active or any other availability status. It is also understood that the above are only examples and status information may be based on other availability status.

Periodic sampling 116 of status information may include receiving the pulse signal that may be transmitted at a predetermined time interval during the unified telephony call. For example, PSI process 10 may transmit a pulse signal at a predetermined time interval (e.g., every 1 second) to one or more participants (e.g., participants 302, 304 and 306) on a call (e.g., UT session 300), where the pulses signal may contain status information based on the availability status of one or more participants of the call. The predetermined time interval may be set by PSI process 10, by an administrator or one or more participants of the call. It is understood that the above are examples and other methods for setting the predetermined time interval may be used.

In one embodiment, PSI process 10 may receive 110 a request for the status information associated with the first user from at least one participant associated with the call (e.g., UT session). A participant may want to determine the status of another participant on the call. Referring also to FIG. 3, one or more participants (i.e., one or more of participants 302, 304 and 306) in the UT session 300 may want to determine the availability of one or more participants (i.e., another of participants 302, 304 and 306) in UT session 300. For example, during UT session 300, participants 302 and 306 may be in discussion with each other, participant 306 may ask participant 304 a question, however, participant 304 may not respond. One or more of participants 302, 306 in UT session 300 may be interested in determining the availability status of participant 304. One or more of participants 302, 306 in UT session 300 may request the availability status of participant 304. For example, a participant may request the availability status by pressing a button or a succession of button clicks, using an audible command, using a pointer or selecting an entry on computing devices, or the like which may be designated for submitting a request for availability status of a participant. It is understood that the above are examples and other methods of requests may be implemented and used in order to request the status information of participants on the call. In response to receiving 110 the request for status information associated with the first user, PSI process 10 may receive 100 the status information associated with the first user (e.g., as a result of PSI process 10 transmitting a request for status information associated with the first user, periodically sampling status information associated with the first user, continuously sampling status information, or the like).

As explained above, PSI process 10 may determine 102 the availability status for the first user based on, at least in part, the status information. For example, the status information of participant 304 may be transmitted by computing device 310 and may be received by PSI process 10. PSI process 10 may determine 102 the availability status of one or more participant (e.g., participants 302, 304 and 306) on a call (e.g., UT session 300). The status information may indicate the availability of one or more participants on a call (e.g., UT session 300). The availability of participants may be predetermined by participants on the call, PSI process 10, or an administrator. The availability may be based, for example, on whether a participant is available, available but muted, available but indisposed, having audio or reception issues, dropped from the call but still active. For example, when participant 306 asked participant 304 a question, participant 304 may have been muted. The status information of participant 304 may be transmitted by computing device 310 and may be received by PSI process 10. It is understood that participant 304 being muted is an example and other availability conditions may be possible. It is also understood that the above are only examples and status information may be based on other availability status.

PSI process 10 may provide 104 a status indicator associated with the first user to at least a second user participating in the unified telephony call based on the availability status for the first user. As explained above, PSI process 10 may provide 104 participants (e.g., participants 302, 304 and 306) on a call (e.g., UT session 300) with a status indicator representative of the availability of participants on the call. For example and also referring to FIG. 4, there is shown an detailed view of display 314 of computing device 308 belonging to participant 302 who may be a participant on UT session 300 with two other participants (e.g., participants 304 and 306). It is understood that although UT session 300 contains three participants, the UT session may contain two or more participants.

Figure 4:
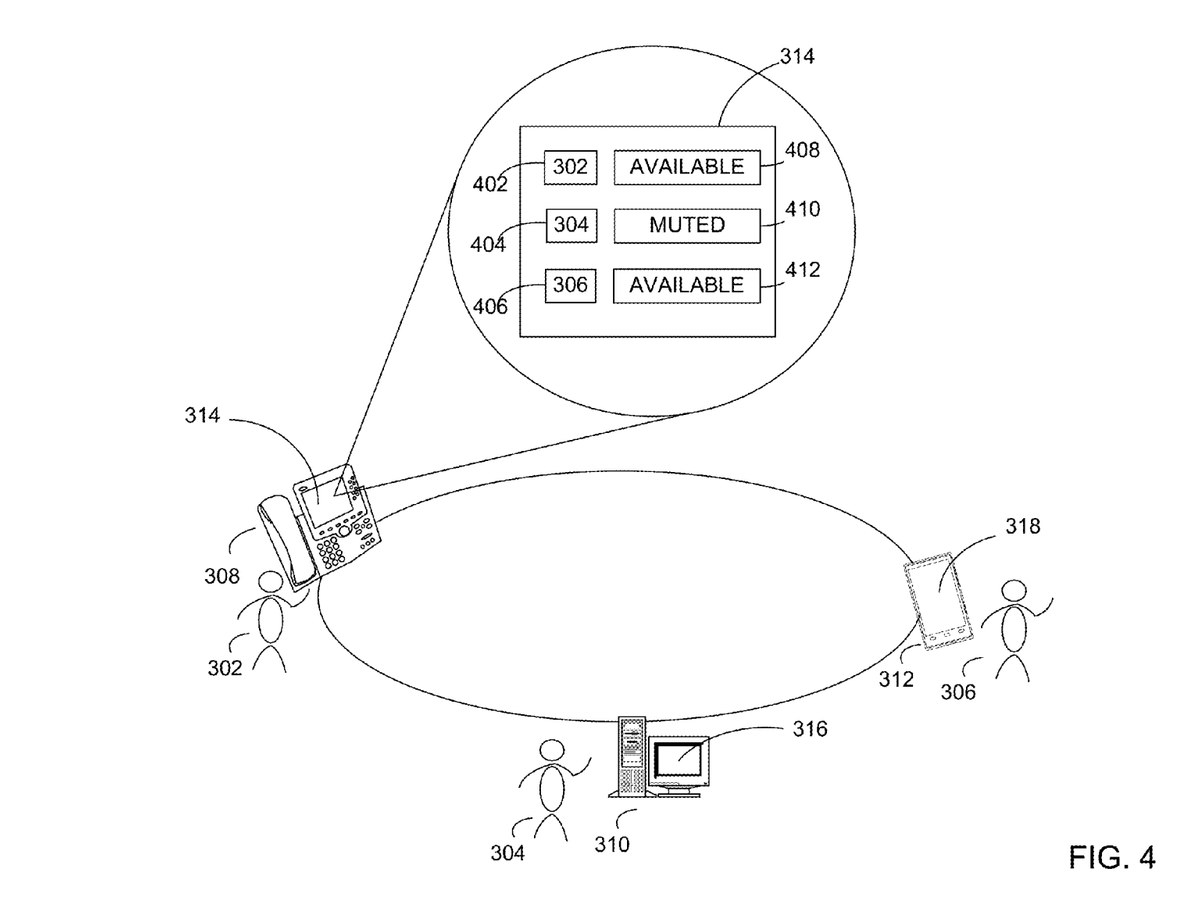
FIG. 4 is a diagrammatic view of an aspect of an implementation of the participant status indication process.

In some embodiments, a visual indicator or an audible indicator may be associated with the status indicator. The visual indicator and the audible indicator may also be associated with a participant (e.g., participants 302, 304 and 306) on the call (e.g., UT session 300). For example, and referring also to FIG. 4, providing 104 a status indicator associated with the first user may include transmitting 108 a visual indicator to one or more participant devices. For example, as shown, a status indicator (e.g., visual indicators 408, 410 and 412) associated with each participant (e.g., participants 302, 304 and 306) on the call (e.g., UT session 300) may be transmitted 108 to, and thereby displayed via, computing device 308 associated with participant 302. Although, FIG. 4 shows a textual representation of the visual indicator, the visual indicator may be an alphanumeric sequence, a numerical code, or an icon signifying a status indicator from a predetermined list of possible status indicators. It is understood that the above are only for illustrative purposes and other visual indicators may be used.

As explained above, there are various techniques for obtaining the status information of participants on a call. In one example, a participant may press a button in order to determine the availability of another participant on the call. For example, UT session 300 participants 302 and 306 may be in discussion with each. Participant 306 may ask participant 304 a question, however, participant 304 may not respond. Participant 302 may be interested in determining the availability of participant 304. Participant 302 may press a button on his or her computing device 308 to determine the availability of participant 304. As explained above, PSI process 10 may provide 104 a status indicator associated with one or more participants to at least one participant on the call based on the availability status of one or more participants. For example, PSI process 10 may provide 104 participant 302 with a status indicator that may include the availability status of user 304. If the status indicator is an audible sound, participant 302, for example upon pressing a button, may hear the availability status of participant 304. For example, if participant 304 is muted, participant 302 may hear "participant 304 is available on the call but muted." It is understood that the audible indicator described above is not intended to be a limitation but instead is only an example of an audible indicator that may be utilized to convey the availability status of participants on a call. In FIG. 4, the status indicator is shown as a visual indicator (i.e., visual indicators 408, 410 and 412). Each participant (e.g., participants 302, 304 and 306) may be identified by a representation (e.g., representations 402, 404, and 403) associated with the visual indicator (i.e., visual indicators 408, 410 and 412) on participants' computing devices (e.g., participants 302, 304 and 306). Representations 402, 404 and 406 may be a textual representation, a picture or an icon representation of participants. In one implementation, a green icon may be associated with participants that are available on the call. Other availability conditions may be represented by different icon color or shapes. Although participants' representation may be textual, a picture or an icon, other representations may be used to associate participants with visual indicators.

As explained above, the status information may indicate the availability of one or more participants on a real-time call (e.g., UT session 300). The availability of participants may be predetermined by participants on the call, PSI process 10 or an administrator. The availability may be based, for example, on whether a participant is available, available but muted, available but indisposed, having audio or reception issues, dropped from the call but still active. It is understood that the above are only examples and that status information may be based on other availability conditions. In the above example and upon pressing a button, computing device 308 of participant 302 may display visual indicator 410 (associated with participant 304) that may show the availability status of participant 304.

Figure 5:
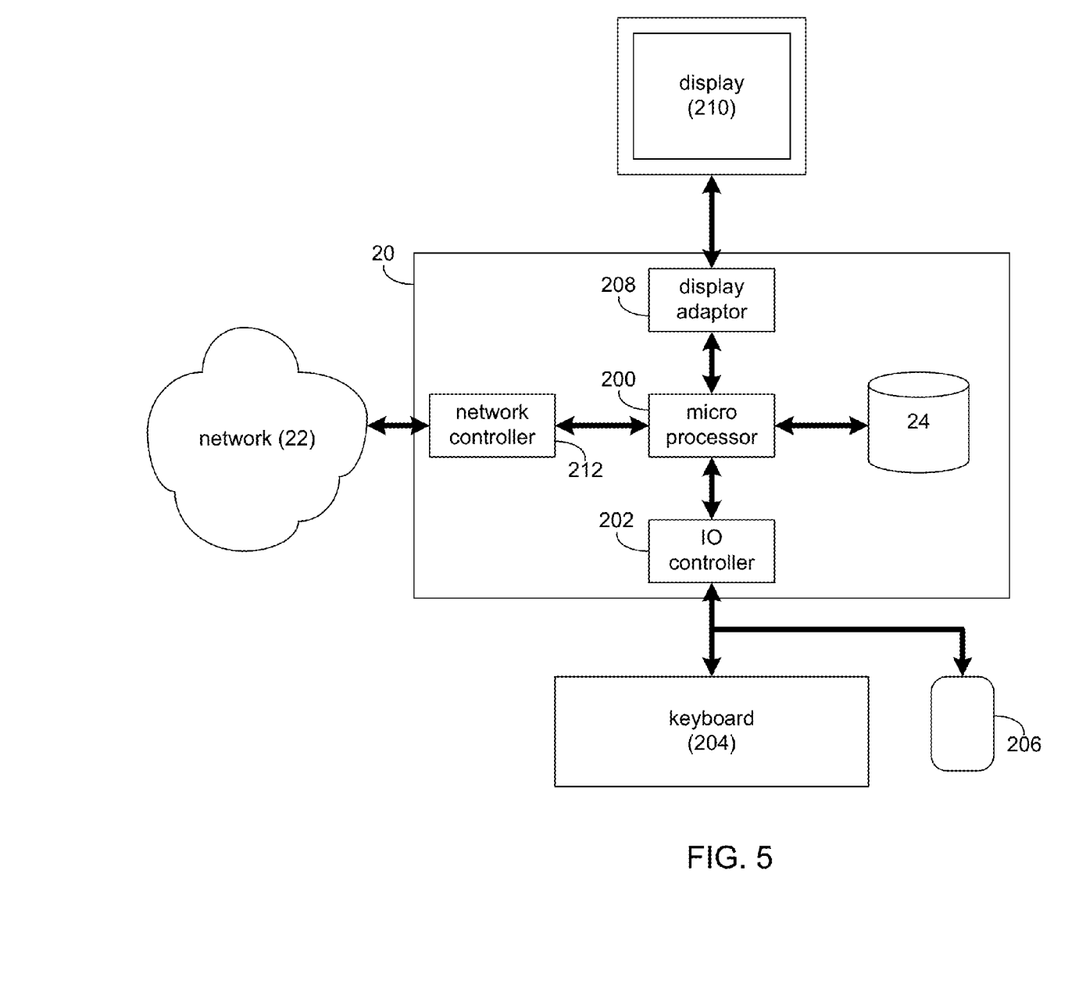
FIG. 5 is a diagrammatic view of the computing device of FIG. 1, according to an implementation of the present disclosure.

Referring also to FIG. 5, there is shown a diagrammatic view of computing system 20. While computing system 20 is shown in this figure, this is for illustrative purposes only and is not intended to be a limitation of this disclosure, as other configuration are possible. For example, any computing device capable of executing, in whole or in part, PSI process 10 may be substituted for computing device 20 within FIG. 5, examples of which may include but are not limited to client electronic devices 28, 30, 32, 34.

Computing system 20 may include microprocessor 200 configured to e.g., process data and execute instructions/code for navigation process 10. Microprocessor 200 may be coupled to storage device 24. As discussed above, examples of storage device 24 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 22 (e.g., the Internet or a local area network).

As will be appreciated by one skilled in the art, the present disclosure may be embodied as a method (e.g., executing in whole or in part on computing device 20), a system (e.g., computing device 20), or a computer program product (e.g., encoded within storage device 24). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 24) having computer-usable program code embodied in the medium.

Any suitable computer usable or computer readable medium (e.g., storage device 24) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 22).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 20), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 24) that may direct a computer (e.g., computing device 20) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 20) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
    receiving, on one or more computing devices, a request for an availability status for a first user that is currently participating in a unified telephony call to communicate while participating in the unified telephony call, the request received from a second participant that is currently participating in the unified telephony call;
    receiving, on the one or more computing devices, status information associated with the first user that is currently participating in the unified telephony call via a pulse signal, the status information indicative of an availability of the first user as set by the first user, wherein the pulse signal is also transmitted from the first user that is currently participating in the unified telephony call directly to at least the second participant that is currently participating in the unified telephony call in response to a periodically transmitted request for the status information associated with one or more participants currently participating in the unified telephony call, wherein the status information includes whether the first user is experiencing at least one of audio and reception issues and further includes whether the first user is available but muted;
    determining, on the one or more computing devices, the availability status for the first user that is currently participating in the unified telephony call based on, at least in part, the status information;
    and providing, on the one or more computing devices, a status indicator associated with the first user that is currently participating in the unified telephony call to at least the second user that is currently participating in the unified telephony call based on the availability status for the first user.

2. The computer-implemented method of claim 1 wherein receiving status information associated with the first user includes continuously receiving status information during the unified telephony call.

3. The computer-implemented method of claim 1 wherein receiving status information associated with the first user includes periodically sampling status information during the unified telephony call.

4. The computer-implemented method of claim 3 wherein the periodically sampling status information includes receiving the pulse signal transmitted at a predetermined time interval during the unified telephony call.

5. The computer-implemented method of claim 1 further comprising:
    associating one or more visual indicators with the one or more status indicators associated with the first user.

6. The computer-implemented method of claim 1 further comprising:
    receiving the request for the status information associated with the first user from at least one participant device associated with the unified telephony call.

7. The computer-implemented method of claim 1 wherein the status indicator includes one or more of alphanumeric sequences, numerical codes, and icons, signifying a status indicator from a predetermined list of status indicators.

8. The computer-implemented method of claim 1 wherein the status indicator includes one or more visual indicators that indicate whether the first user is experiencing at least one of audio and reception issues and whether the first user is available but muted.

9. A computer program product residing on a non-transitory computer readable storage medium having a plurality of instructions stored thereon, which, when executed by a processor, cause the processor to perform operations comprising:
    receiving a request for an availability status for a first user that is currently participating in a unified telephony call to communicate while participating in the unified telephony call, the request received from a second participant that is currently participating in the unified telephony call;
    receiving status information associated with the first user that is currently participating in the unified telephony call via a pulse signal, the status information indicative of an availability of the first user as set by the first user, wherein the pulse signal is also transmitted from the first user that is currently participating in the unified telephony call directly to at least the second participant that is currently participating in the unified telephony call in response to a periodically transmitted request for the status information associated with one or more participants currently participating in the unified telephony call, wherein the status information includes whether the first user is experiencing at least one of audio and reception issues and further includes whether the first user is available but muted;
    determining the availability status for the first user that is currently participating in the unified telephony call based on, at least in part, the status information;
    and providing a status indicator associated with the first user that is currently participating in the unified telephony call to at least the second user that is currently participating in the unified telephony call based on the availability status for the first user.

10. The computer program product of claim 9 wherein receiving status information associated with the first user includes continuously receiving status information during the unified telephony call.

11. The computer program product of claim 9 wherein receiving status information associated with the first user includes periodically sampling status information during the unified telephony call.

12. The computer program product of claim 11 wherein the periodically sampling status information includes receiving the pulse signal transmitted at a predetermined time interval during the unified telephony call.

13. The computer program product of claim 9 wherein the operations further comprise:
associating one or more visual indicators with the one or more status indicators associated with the first user.

14. The computer program product of claim 9 wherein the operations further comprise:
receiving the request for the status information associated with the first user from at least one participant device associated with the unified telephony call.

15. The computer program product of claim 9 wherein the status indicator includes one or more of alphanumeric sequences, numerical codes, and icons, signifying a status indicator from a predetermined list of status indicators.

16. The computer program product of claim 9 wherein the status indicator includes one or more visual indicators that indicate whether the first user is experiencing at least one of audio and reception issues and whether the first user is available but muted.

17. A computing system comprising: at least one processor;
at least one memory architecture coupled with the at least one processor;
a first software module executable by the at least one processor and the at least one memory architecture, wherein the first software module is configured to receive a request for an availability status for a first user that is currently participating in a unified telephony call to communicate while participating in the unified telephony call, the request received from a second participant that is currently participating in the unified telephony call;
a second software module executable by the at least one processor and the at least one memory architecture, wherein the second software module is configured to receive status information associated with the first user that is currently participating in the unified telephony call via a pulse signal, the status information indicative of an availability of the first user as set by the first user, wherein the pulse signal is also transmitted from the first user that is currently participating in the unified telephony call directly to at least the second participant that is currently participating in the unified telephony call in response to a periodically transmitted request for the status information associated with one or more participants currently participating in the unified telephony call, wherein the status information includes whether the first user is experiencing at least one of audio and reception issues and further includes whether the first user is available but muted;
a third software module executable by the at least one processor and the at least one memory architecture, wherein the third software module is configured to determine the availability status for the first user that is currently participating in the unified telephony call based on, at least in part, the status information;
and a fourth software module executable by the at least one processor and the at least one memory architecture, wherein the fourth software module is configured to provide a status indicator associated with the first user that is currently participating in the unified telephony call to at least the second user that is currently participating in the unified telephony call based on the availability status for the first user.

18. The computing system of claim 17 wherein receiving status information associated with the first user includes continuously receiving status information during the unified telephony call.

19. The computing system of claim 17 wherein receiving status information associated with the first user includes periodically sampling status information during the unified telephony call.

20. The computing system of claim 19 wherein the periodically sampling of status information includes receiving the pulse signal transmitted at a predetermined time interval during the unified telephony call.

21. The computing system of claim 17 further comprising:
a fifth software module executable by the at least one processor and the at least one memory architecture, wherein the fourth software module is configured to associating one or more visual indicators with the one or more status indicators associated with the first user.

22. The computing system of claim 17 wherein the first software module is configured to receiving the request for the status information associated with the first user from at least one participant device associated with the unified telephony call.

23. The computing system of claim 17 wherein the status indicator includes one or more of alphanumeric sequences, numerical codes, and icons, signifying a status indicator from a predetermined list of status indicators.

24. The computing system of claim 17 wherein the status indicator includes one or more visual indicators that indicate whether the first user is experiencing at least one of audio and reception issues and whether the first user is available but muted.

* * * * *